United States Patent [19]
Fiedler

[11] Patent Number: 5,769,399
[45] Date of Patent: Jun. 23, 1998

[54] VIBRATION-REDUCING BEARING

[76] Inventor: Kurt Fiedler, Zeppelinring 3, 65468 Trebur, Germany

[21] Appl. No.: 696,338

[22] Filed: Aug. 13, 1996

[30] Foreign Application Priority Data

Aug. 31, 1995 [DE] Germany .................. 295 14 004.6

[51] Int. Cl.$^6$ ................................................ F16F 13/06
[52] U.S. Cl. .............. 267/140.11; 267/219; 267/140.12; 267/140.13; 267/140.5
[58] Field of Search .................. 267/140.11, 140.12, 267/140.13, 219, 220, 122, 140.5, 141.6; 180/300, 312, 902; 248/562, 636, 638

[56] References Cited

U.S. PATENT DOCUMENTS

| | | | |
|---|---|---|---|
| 4,741,521 | 5/1988 | Schiffner et al. | 267/140.12 |
| 4,840,357 | 6/1989 | Jouade | 267/140.12 |
| 4,962,915 | 10/1990 | Thorn | 267/140.5 |
| 4,964,623 | 10/1990 | Thorn | 267/140.12 |
| 5,531,426 | 7/1996 | Brühl | 267/140.5 |
| 5,551,675 | 9/1996 | Simuttis et al. | 267/140.12 |

FOREIGN PATENT DOCUMENTS

| | | | |
|---|---|---|---|
| 3831644 | 3/1990 | Germany | 267/140.12 |
| 3831645 | 4/1990 | Germany | 267/140.12 |
| 4117129 | 11/1992 | Germany | 267/140.12 |
| 4117130 | 11/1992 | Germany | 267/140.12 |
| 60-179540 | 9/1985 | Japan | 267/140.12 |

*Primary Examiner*—Douglas C. Butler
*Attorney, Agent, or Firm*—Harness, Dickey & Pierce, P.L.C.

[57] ABSTRACT

When a unit such as a motor or other vibrating apparatus is suspended in a fixed frame, superior damping of vibration, oriented along multiple vibration axis, may be accomplished by use of the present embodiment. A supporting body, containing multiple cavities filled with a damping fluid, is located between a supporting member and a bearing member. The cavities are connected to each other by tubes. The vibration of the unit which may occur along multiple vibration axes is effectively damped by compression of the cavities and subsequent transfer of fluid through the tubes.

25 Claims, 4 Drawing Sheets

VIBRATION-REDUCING BEARING

BACKGROUND OF THE INVENTION

1. Technical Field

The present invention relates to a hydraulically damped bearing that reduces vibration of a suspended unit in a frame, and more particularly, this invention relates to a hydraulically damped bearing that reduces vibration of a suspended motor and/or a gear unit in a motor vehicle frame.

2. Description of the Related Art

The use of hydraulically damped bearings to reduce vibration of a suspended unit, vibrating at its natural frequency, in a frame has been previously known. Such an apparatus minimizes the stresses exerted on the frame by the vibration of the unit. Hydraulically damped bearings are used, e.g., for reducing vibration of a motor suspended in a vehicle frame. Here, a motor starts to vibrate because of unbalanced inertia forces and torques or because of a change in the rotational speed due to alternate braking and accelerating. Currently, known hydraulically damped bearings have a bearing member connected to the unit or frame and a supporting member connected to the unit or frame. Between the bearing member and the supporting member, there is an arranged elastic supporting body that is compressible along a first vibration axis of the unit. Further, to improve the damping properties of the bearing, two cavities filled with damping fluid are provided within the supporting body in the region of the first vibration axis. The two cavities are connected to each other by means of a connecting member.

As soon as the unit starts to vibrate within the frame, there is relative movement between the bearing member and the supporting member, along the first vibration axis. Due to this relative movement, the elastic supporting body, arranged between the bearing member and the supporting member, is at first compressed along the vibration axis. Here, the volume of the first cavity decreases, while, at the same time, the volume of the second cavity increases. During the subsequent extension of the supporting body along the first vibration axis, the volume of the first cavity increases while that of the second cavity decreases. Due to these changes in volume, the damping fluid is pumped to and from one cavity and the other via the connecting member, thus damping the vibrations of the unit.

For vibrations occurring along a second vibration axis which are different than the vibrations occurring along the first axis, the cavity volumes change only slightly when compared to the volume changes induced by vibrations along the first axis. This means that less damping fluid is pumped to and from one cavity and the other, so that the damping effect of the bearing is reduced.

An objective of the present invention is to provide a hydraulically damped bearing which dampens vibrations occurring along a plurality of different vibration axes.

SUMMARY OF THE INVENTION

In a hydraulically damped bearing of the above-mentioned type, this objective is achieved according to the invention by arranging the second cavity at least approximately in the region of the second vibration axis, the course of which differs from that of the first vibration axis.

According to the invention, the two cavities in the hydraulically damped bearing are arranged in the elastic supporting body in such a way as to locate these cavities in regions of different, predetermined, vibration axes. For instance, one cavity may be arranged along a first vibration axis, and a second cavity may be arranged along a second vibration axis. If the unit vibrates within the frame in the direction of the first vibration axis, the volume of the first cavity changes, while the second cavity, in comparison, experiences a considerably smaller change in volume. Due to the different changes in volume of these two cavities during vibration, the damping fluid must be pumped from the first cavity, through the connecting member, and into the second cavity. This pumping occurs against the pressure acting in the second cavity, thus damping the movement of the bearing member relative to the supporting member in the direction of the first vibration axis.

If the unit vibrates in the direction of the second vibration axis, a direction different than the first vibration axis, the resulting change in volume of the second cavity is much larger than the change in volume of the first cavity. This means that the damping fluid must be pumped from the second cavity into the first cavity against the pressure acting in the first cavity. In this manner, the vibration of the bearing member in the direction of the second vibration axis is effectively damped.

According to the invention, the hydraulically damped bearing may be advantageously used for suspending a motor, especially a transverse front motor, in the frame of a motor vehicle. However, it can also be used, e.g., for reducing the vibration of a washing machine drum suspended in a washing machine frame or a conveyor suspended in a frame. Depending on the field of application, the bearing member is either connected to the unit or to the frame. For this purpose, the bearing member may be shaped as a bush, flange, or the like. It is also conceivable to provide a bearing member which is a component of the unit or frame.

Similarly, the supporting member may be in the form of a separate member which is mounted to the frame or the motor. Alternatively, the supporting member may be an integral part of the frame or unit.

The supporting body, arranged between the bearing member and the supporting member, is made of an elastic material such as natural rubber or a resilient plastic material. The supporting body may be rigidly connected to the bearing member or supporting member. For this purpose, the bearing member may, for example, be polygonal in cross-section to ensure a form-fit connection between the supporting body and the bearing member. The supporting member may also have a similar shape, and it may, for example, have naps or projections protruding into the supporting body to provide a rigid connection with the supporting body. On the other hand, it is conceivable to movably connect the supporting body with the bearing member and/or the supporting member to enable the supporting body to be received with as little stress as possible between the bearing member and the supporting member. For this purpose, both the bearing member and the supporting member may have a smooth, anti-friction, surface which allows the supporting body to move relative to the bearing member or the supporting member.

Depending on the purpose of the invention's application, it is possible to provide as many cavities in the supporting body as different vibration axes, wherein each cavity is arranged in the region of one of the vibration axes. If the hydraulically damped bearing of the present invention is used in a motor vehicle, and this vehicle is driven by a transverse front motor with a five speed gear unit, there are five different axial directions in which this motor can vibrate relative to the motor vehicle frame. Therefore, five cavities will be provided in the supporting body of the present invention.

The shapes of the cavities are chosen depending on the purpose of the invention's application in each particular case. The cavity in the supporting body may, for example, be cuboid, wherein the cavity would extend parallel to the supporting member in the longitudinal direction. Here, the vibration axis would extend perpendicularly through the top and bottom surfaces of the cavity. If a cavity shaped in this manner is deformed, the result is only a slight deformation of the front surface of the cavity. Thus, there will be an approximately linear change in volume depending on the oscillation amplitude. It is also conceivable to provide a prism-shaped, cylindrical or spherical cavity.

Further, to modify the damping properties of the hydraulically damped bearing, the cavity may be arranged within the elastic supporting body such that it is located in a region undergoing strong elastic deformation. This means that the cavity experiences a large change in volume with a correspondingly large influence on damping. As an alternative, the cavity may be located in a region undergoing less deformation, and therefore, the damping properties will be reduced.

In a first aspect of the present invention, the supporting body is cylindrically shaped with flattened sides. This shape saves space and permits a form-fit connection with the supporting member. On the other hand, the supporting body may also be cuboid or prism-shaped. The supporting body may also be shaped as a spherical segment so that it can be movably received in the supporting member and mounted in a stress-free manner.

Advantageously, the supporting body is arranged concentrically to the bearing member so that the forces acting on the hydraulically damped bearing are equally distributed within the supporting body. In this embodiment, rotation of the supporting body relative to the bearing member is prevented by rigidly connecting the supporting body to the bearing member. By arranging the supporting body eccentrically in a predetermined direction relative to the bearing member, e.g. in the direction of braking of a motor vehicle, the rigidity of the bearing in this predetermined direction can be increased and, at the same time, more space can be made available for cavities in the enlarged region of the supporting body.

Advantageously, the supporting member is shell-shaped and at least partially surrounds the supporting body, so that the supporting body is supported by the supporting member. In another embodiment, the supporting member is shaped as a cylinder jacket. Here, preferably, the cylinder jacket is flat on the sides for simple attachment to the frame or the unit. Of course, the supporting member may also be prism-shaped. For facilitating the mounting of the supporting body in the supporting member, the supporting member may also consist of several parts.

In a second aspect of the present invention, one of the cavities serves as a reservoir for the damping fluid. For this purpose, a portion of the cavity walls comprises a membrane which is strongly deformed during compression of the supporting body and acts as a pump. It is also conceivable to connect the cavities of the supporting body via a connecting channel with a reservoir arranged outside the hydraulically damped bearing.

Further, the cavities are advantageously connected to each other via a tube in the form of a ring portion. For this purpose, at least one opening is provided in the tube for each cavity region to allow the damping fluid to flow in or out of the cavity. By appropriately choosing the diameter of this opening, it is possible to influence the flow rate of the damping fluid flowing into or out of the cavity, and this will correspond to a change in the damping rate. In a special embodiment, there is provided at least one control nap within the cavity which closes the opening of the tube when a predetermined stroke is exceeded during compression of the supporting body, so that the cavity is either completely closed or, if there is more than one opening, less damping fluid can flow out of the cavity. It is also conceivable to interconnect the cavities via a channel arranged in a portion of the supporting body which undergoes hardly any compression. On the other hand, the channel may also be arranged in a portion of the supporting body which is compressed, so that the channel is closed if a predetermined stroke is exceeded during compression of the supporting body.

DESCRIPTION OF THE PREFERRED EMBODIMENT

In the following, the invention is described in detail with reference to the accompanying drawings.

Figure 1:
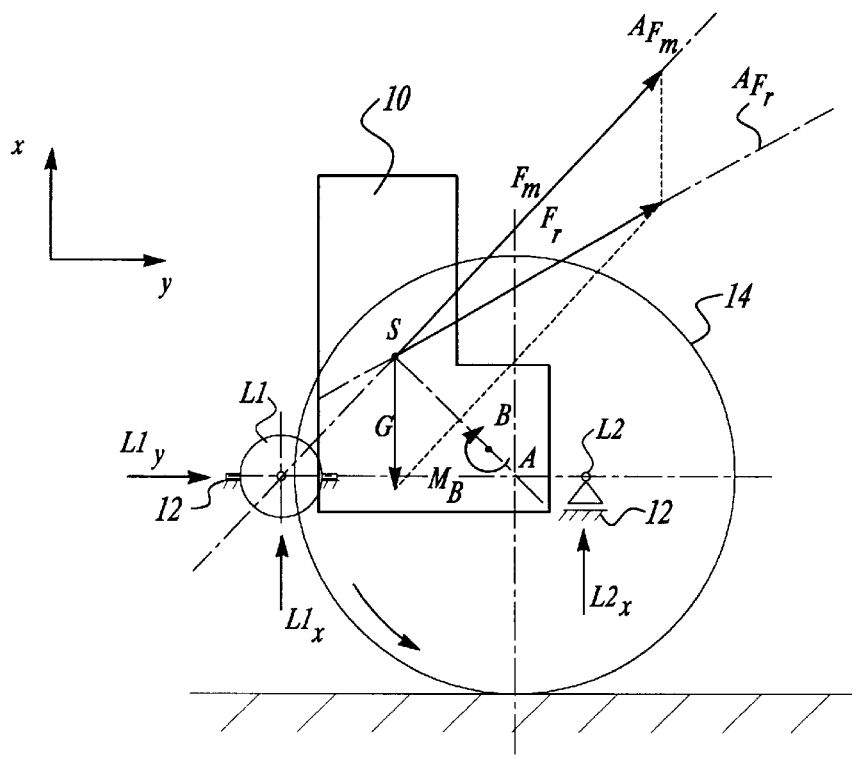
FIG. 1 is a schematic view of the relationship between forces acting in the vibration-reducing suspension of a motor.

FIG. 1 shows the forces acting on the suspension of transverse front motor 10 of a motor vehicle with front wheel drive. The front motor 10 is suspended in a vibration-reducing manner by means of a hydraulically damped bearing L1, shown on the left in FIG. 1, and a movable bearing L2 in a vehicle frame 12 of a motor vehicle. During the operation of the motor vehicle, the torque of the front motor 10 is transmitted by a gear unit, integrated into the motor unit, to a front wheel 14 rotatably supported on the vehicle frame 12 at a point A. The amount of driving torque actually effective at the point A depends on the driving conditions, i.e., on the selected gear. To determine the forces acting on the two bearings L1 and L2, the driving torque actually effective at point A is translated into a torque MB acting at an imaginary center of rotation B in the front motor 10. This torque MB would cause a rotation of the front motor 10 about the center of rotation B if the front motor 10 were not suspended at the two bearings L1 and L2. To describe, in detail, the function of the hydraulically damped bearing L1, a front motor 10 having a gear unit, switchable between neutral gear and first gear, is used in this embodiment.

If the front motor 10 is operated in neutral gear, the gear unit of the front motor 10 does not transmit any driving torque to the front wheel 14. Thus, there is only a weight G, resulting from the weight of the front motor 10 and the gear unit, which acts on a center of gravity S in the front motor 10. This weight G points in the negative x-direction and causes bearing reaction forces L1x and L2x which point in the positive x-direction at the bearings L1 and L2.

As soon as the gear unit is switched to first gear, the torque of the front motor 10 is transmitted to the front wheel 14, and the torque MB acts at the imaginary center of rotation B. By dividing the torque MB by the distance between the center of gravity S and the imaginary center of rotation B, the torque MB can be shown as a moment force Fm acting at the center of gravity S. This moment force acts in the direction of an axis AFm which extends through the center of gravity S and the hydraulically damped bearing L1 which suspends the front motor 10.

Since the weight G continues to act during operation of the front motor 10 in first gear, a resultant force Fr results from the combination of the weight G and the moment force Fm. This resultant force Fr extends along a second axis AFr through the center of gravity S. The size and direction of the resultant force Fr are only determined by the size of the moment force Fm since the direction of the moment force Fm as well as the amount and the direction of the weight G are not influenced by the amount of torque MB. It is immediately evident that if there is a change in the driving torque MB, the amount of which depends on the selected gear, the amount of moment force Fm, and, consequently, the amount and direction of the resultant force Fr will also change.

The size and direction of the resultant force Fr causes bearing reactions in both bearings L1 and L2. In the x-direction, the resultant force Fr causes reaction forces L1x and L2x in the bearings L1 and L2, respectively. In the y-direction, only the bearing L1 is capable of absorbing the y-component of the resultant force Fr, since the movable bearing L2 can only counteract forces which act in the x-direction. The resultant force Fr causes a reaction force L1y in the bearing L1.

Figure 2:
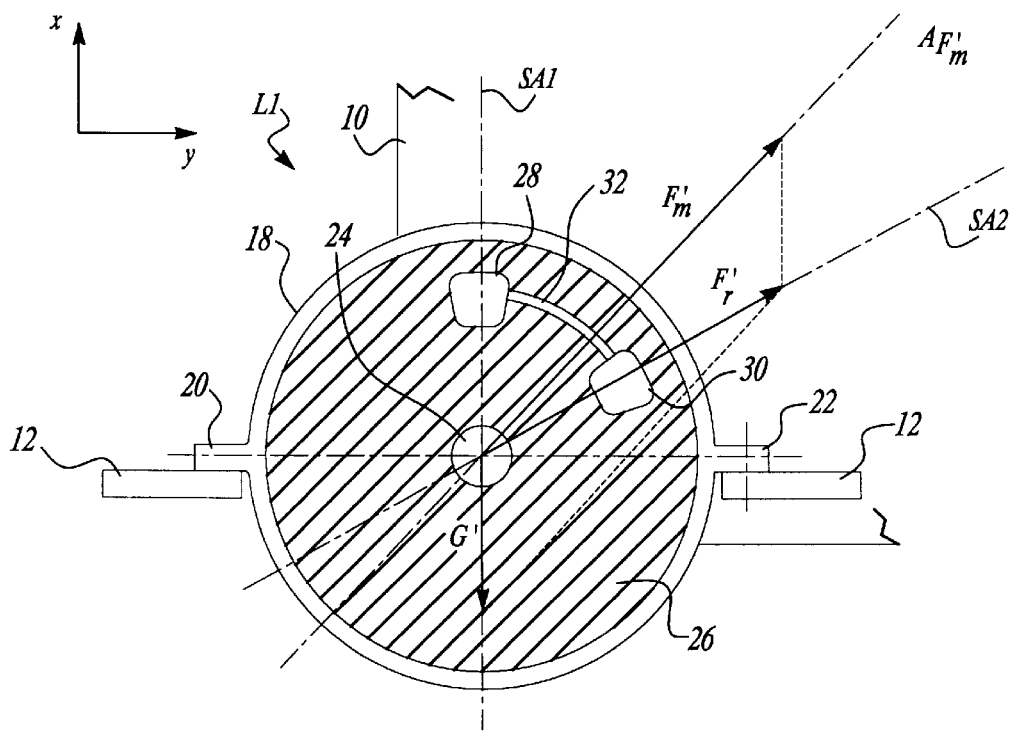
FIG. 2 is a sectional front view of a first embodiment of a hydraulically damped bearing and the forces acting thereon.

FIG. 2 shows an enlarged sectional view of the hydraulically damped bearing L1 of FIG. 1. The hydraulically damped bearing L1 has a cylindrical supporting member 18 with two mutually opposed coupling members 20 and 22 which extend radially from the outer circumference of the supporting member in the y-direction. Each of the coupling members 20 and 22 is fixedly connected to the vehicle frame 12 of the vehicle by means of screws or rivets. A bearing bush 24 extends concentrically to the supporting member 18 and is attached to the front motor 10 by means of screws. Furthermore, said bearing bush is arranged within the supporting member 18. Between the supporting member 18 and the bearing flange 24, there is provided an elastic supporting body 26 made of a rubber-like material which is fixedly connected to both the supporting member 18 and the bearing flange 24, e.g. by vulcanization. Two approximately cuboid cavities 28 and 30, having the same radial distance from the bearing bush 24, are formed in the supporting body 26. The cavities extend in the longitudinal direction parallel to the bearing bush 24, and are arranged in the region of a first vibration axis SA1 and a second vibration axis SA2, respectively. Here, the cavities intersect the respective axis. The two cavities 28 and 30 are filled with a damping fluid and are connected to each other via a channel 32 formed in the supporting body 26.

As already mentioned above, different forces arise depending on the selected gear, and these forces act on the bearing L1. If the front motor 10 is operated in neutral gear, a weight component G', resulting proportionally from the weight G and extending in the x-direction through the bearing bush 24, acts on the bearing bush 24. When the front motor 10 starts to vibrate, the vibration occurs along the first vibration axis SA1 which extends through the bearing bush 24. The course of this vibration axis SA1 corresponds to the direction of the weight component G'. If the front motor 10 is operated in first gear, the moment force component Fm' acts on the bearing bush 24 in addition to the weight component G', wherein the moment force component Fm' proportionally results from the moment force Fm. A resultant force component Fr' results from the weight component G' and the moment force component Fm', and acts on the bearing bush 24. If the front motor 10 is operated in first gear, the front motor 10 vibrates along the second vibration axis SA2 extending through the bearing bush 24, wherein the course of the second vibration axis SA2 corresponds to the direction of the resultant force component Fr'.

If the front motor 10 vibrates along the first vibration axis SA1, the volume of the first cavity 28 is increased or reduced, while the volume of the second cavity 30 remains approximately the same. The damping fluid is thus pumped to and from the first cavity 28 and the second cavity 30 via the channel 32. Therefore, the vibrations of the front motor 10 along the first vibration axis SA1 are damped.

If the front motor 10 is operated in first gear, it vibrates along the second vibration axis SA2. Here, the volume of the second cavity 30 is reduced or increased, while the volume of the first cavity 28 remains approximately the same. Therefore, the damping fluid is pumped to and from the first cavity 28 and the second cavity 30. By pumping the fluid to and from, the vibrations of the front motor 10 along the second vibration axis SA2 are damped.

FIG. 2 shows a first embodiment of a hydraulically damped bearing L1 which dampens vibrations along two different vibration axes SA1 and SA2. The bearing does this by means of two cavities 28 and 30. By providing additional cavities in the supporting body, the hydraulically damped bearing can also dampen vibrations along other vibration axes.

Figure 3:
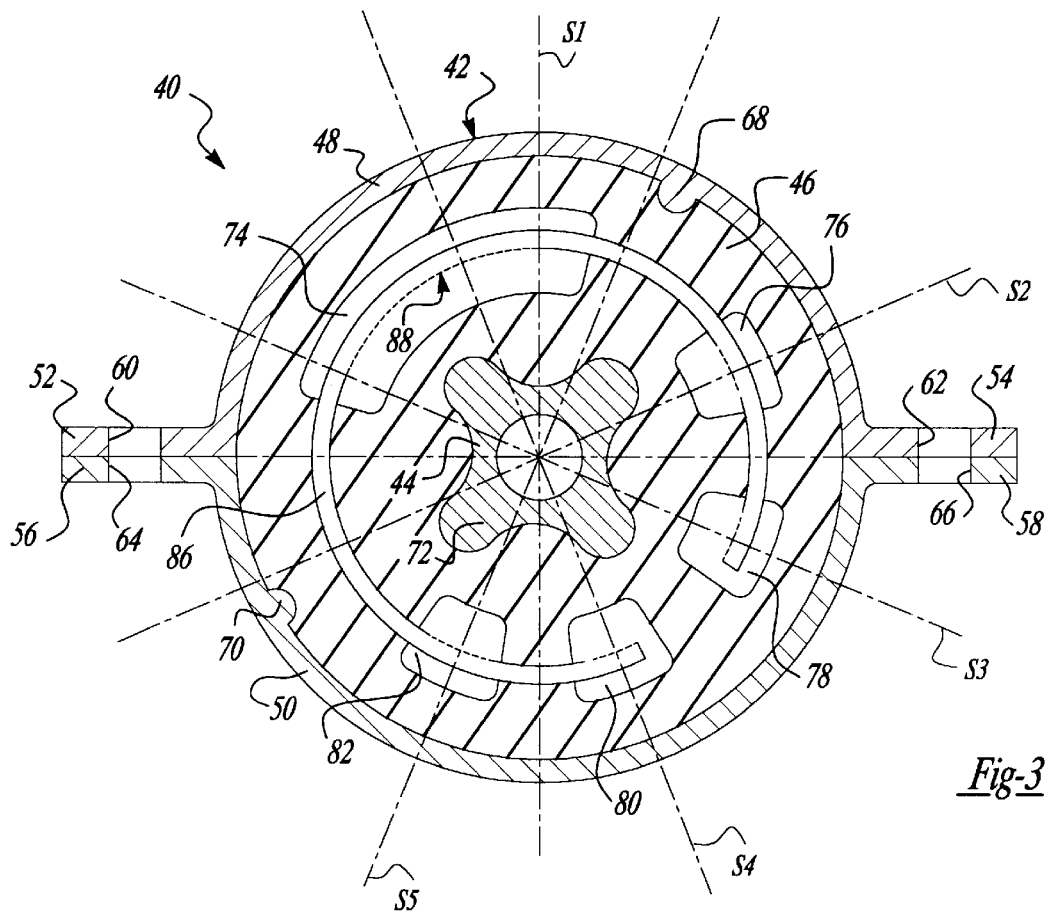
FIG. 3 is a sectional front view of a second embodiment of a hydraulically damped bearing.

FIG. 3 shows a second embodiment of a hydraulically damped bearing 40 used for vibration-reducing suspension of a transverse front motor (not shown) in a vehicle frame (not shown). The bearing 40 dampens vibrations along five different vibration axes S1, S2, S3, S4 and S5. If the front motor is operated in neutral gear, it vibrates along the first vibration axis S1; in first and second gear, it vibrates along the second vibration axis S2; in third and fourth gear, it vibrates along the third vibration axis S3; and in fifth gear, it vibrates along the fourth vibration axis S4. When switching into reverse gear, the front motor vibrates along the fifth vibration axis S5.

The hydraulically damped bearing 40 has a cylindrical supporting member 42, a bearing bush 44 arranged concentrically within the supporting member 42. The bearing bush extends approximately across the entire width of the supporting member 42, and an elastic supporting body 46 arranged between the supporting member 42 and the bearing bush 44 is fixedly connected to both the supporting member and the bearing bush. The supporting member 42 comprises two supporting shells 48 and 50 with connecting flanges 52, 54, 56 and 58 protruding radially outwardly from the ends of said shells 48, 50. Through holes 60, 62, 64 and 66 are formed in each of the connecting flanges 52, 54, 56 and 58. The supporting member 42 is fixedly connected to the front motor or the vehicle frame of the vehicle by screws extending through the through holes. Further, a lug 68 and 70 protruding radially inwardly is provided on each supporting shell 48 and 50. The lugs prevent the supporting body 46 from rotating within the supporting member 42.

Figure 4:
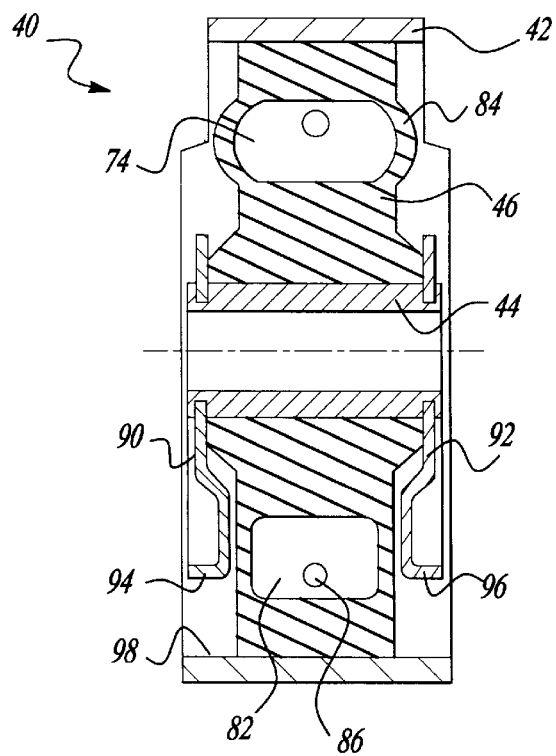
FIG. 4 is a sectional side view of the hydraulically damped bearing according to FIG. 3.

Further, the bearing bush 44 has four cam-like projections 72, regularly spaced about the circumference, which extend radially outward. These projections prevent rotation of the bearing bush 44 within the supporting body 46. A total of five cuboid cavities each having the same radial distance from the bearing bush 44 are formed within the supporting body 46 and are filled with a damping fluid. These cavities 74, 76, 78, 80 and 82 are arranged such that they are each located in the region of one of the vibration axes S1, S2, S3, S4 or S5. The first cavity 74 is larger than the other cavities 76, 78, 80 and 82 and serves as a reservoir. For this purpose, as shown in FIG. 4, the side walls 84 of cavity 74 are convex, i.e. they bulge towards the exterior. The cavities are connected to each other by means of an annular tube portion 86 having a plurality of throttle openings in each cavity 74, 76, 78, 80, 82. Through these openings, the damping fluid can flow to and from the cavities 74, 76, 78, 80 and 82 via the tube portion 86.

Figure 5:
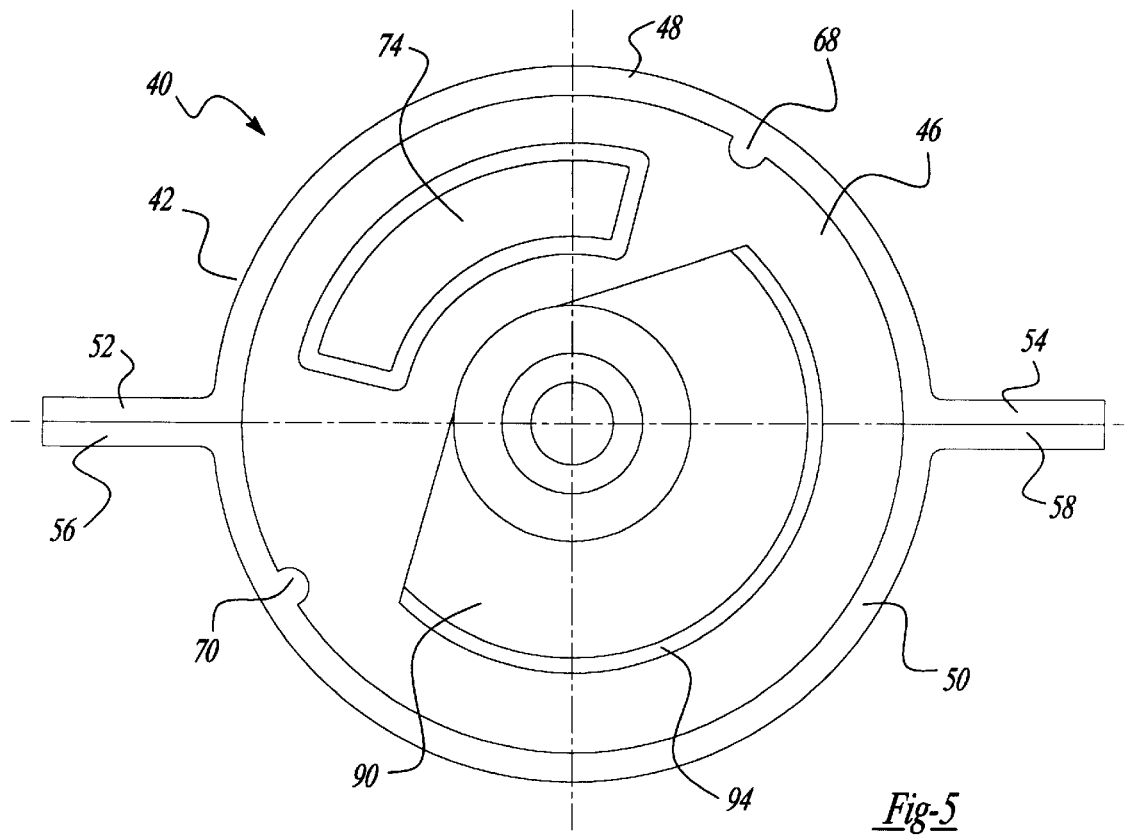
FIG. 5 is a front view of the hydraulically damped bearing according to FIG. 3.

Further, on both sides of the supporting body 46, a side plate 90 and 92 is attached to the bearing bush 44 by flanging. As shown in FIG. 5, the side plate 90 has an approximately semi-circular shape and has a radially outward edge which is bent at a right angle such as to form an edge section 94 which extends parallel to the bearing bush 44. The second side plate 92, arranged on the opposite side of the supporting body 46, is similarly formed. Due to the side plates 90 and 92, arranged on both sides of the supporting body 46, the supporting body 46 is prevented from expanding towards the sides, so that the cavities 76, 78, 80 and 82 can only be compressed or stretched in the radial direction relative to the bearing 44. The bent edge sections 94 and 96 serve as a stop for an inner circumferential surface 98 of the supporting member 42, and thus limits the stroke of the bearing bush 44 relative to the supporting member 42 during vibration. To avoid friction losses, the surfaces of the side plates 90 and 92, facing towards the supporting body 46, are coated with a plastic material, e.g. polytetrafluoroethylene (PTFE).

The function of the bearing 40 will be described in the following. If the front motor starts to vibrate, e.g., in the direction of the second vibration axis S2, the bearing bush 44 starts to move relative to the supporting member 42 along the vibration axis S2. During this movement of the bearing bush 44, the second cavity 76 is compressed or stretched. Therefore, the damping fluid flows to and from the cavities 74, 76, 78, 80 and 82 through the throttle openings 88 and via the annular tube portion 86. While the volumes of the third, fourth and fifth cavity 78, 80 and 82 remain approximately constant, the volume of the first cavity 74, which serves as reservoir, changes since its lateral walls 84 have a particular elastic flexibility. The pumping of the damping fluid to and from and the resulting energy loss, effectively dampen the vibrations along the second vibration axis S2. If the front motor starts vibrating in another direction, e.g. in the direction of the fourth vibration axis S4, the fourth cavity 80 is compressed or stretched accordingly, and the damping fluid is pumped into the other cavities 74, 76, 78 and 82, thus damping the vibrations.

Figure 6:
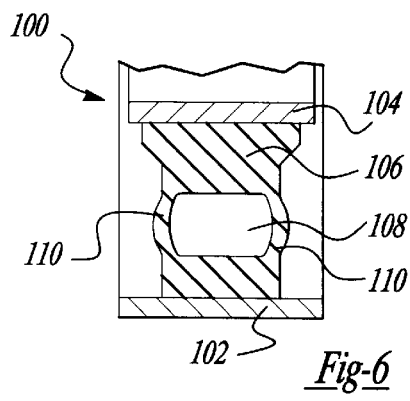
FIG. 6 is a sectional side view of a third embodiment having cavities having convex side walls.
Figure 7:
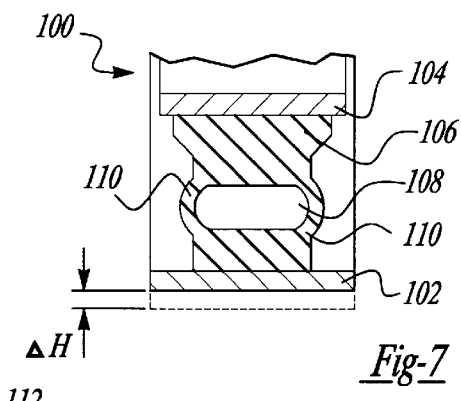
FIG. 7 is a sectional side view of the hydraulic bearing according to FIG. 6 in a loaded condition.

FIGS. 6 and 7 show another embodiment of a hydraulically damped bearing 100 having a supporting member 102, a bearing bush 104 and a supporting body 106 arranged between the supporting member 102 and the bearing bush 104. In this embodiment, cavities 108 are used. These cavities 108 have side walls 110 that are convex, i.e., they bulge towards the exterior. If the cavity 108 is compressed by an amount H, the lateral walls 110 buckle and are pushed outwardly. This results in that the change in volume decreases as the stroke H increases, so that the hydraulically damped bearing exhibits a degressive damping behavior.

Figure 8:
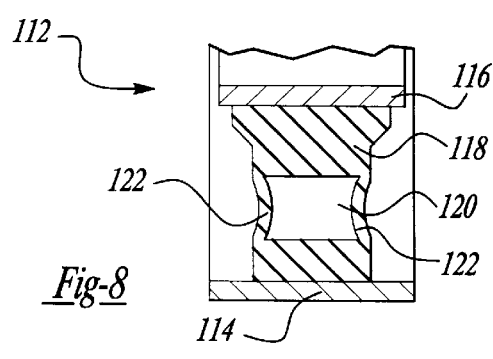
FIG. 8 is a sectional side view of a fourth embodiment of a hydraulically damped bearing having cavities having concave side walls.
Figure 9:
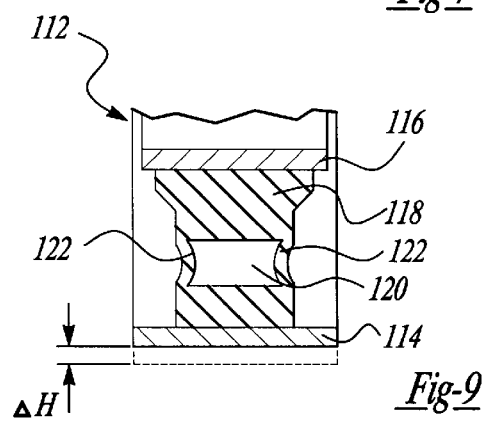
FIG. 9 is a sectional side view of the hydraulic bearing according to FIG. 8 in a loaded condition.

FIGS. 8 and 9 show a fourth embodiment of a hydraulically damped bearing 112 having a supporting member 114, a bearing bush 116 and a supporting body 118 are arranged in between the two. The supporting body 118 has cavities 120 which have side walls 122 that are concave, i.e. they are curved towards the interior of the cavity 120. If the cavity 120 is compressed by an amount H, the elastic side walls 122 are pushed towards the interior, resulting in a progressive change in volume.

Figure 10:
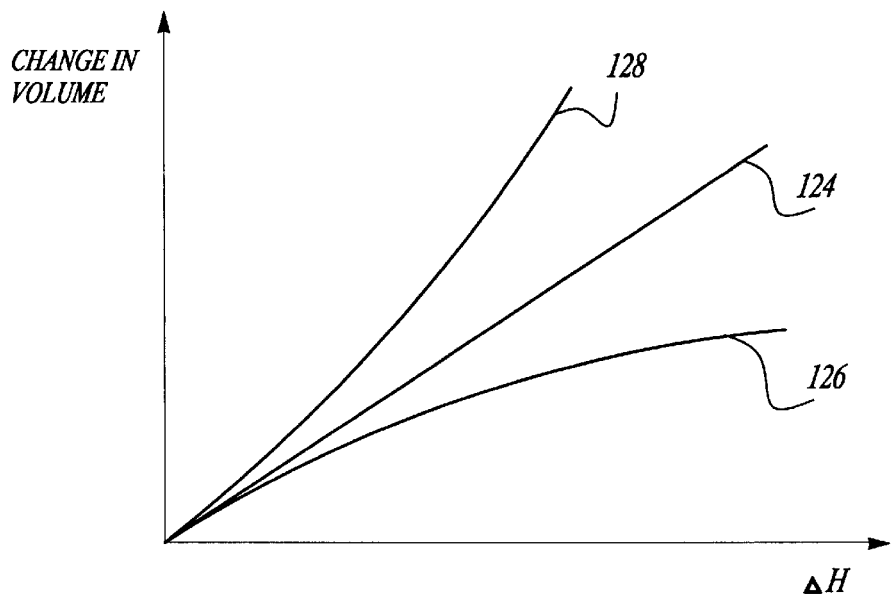
FIG. 10 is a diagram showing the course of the change in volume depending on the stroke.

FIG. 10 shows the different changes in volume depending on the stroke H. The curve 124 shows a linear dependency of the change in volume on the stroke H that occurs in cavities having straight side walls. A degressive change in volume as it is shown by curve 126 occurs in cavities having convex, i.e. outwardly bulging side walls. A progressive change in volume and thus a progressive damping behavior is illustrated by curve 128. Such changes in volume are caused by cavities having side walls that are concave, i.e. curved towards the interior, which are pushed inwardly during compression of the cavity.

Figure 11:
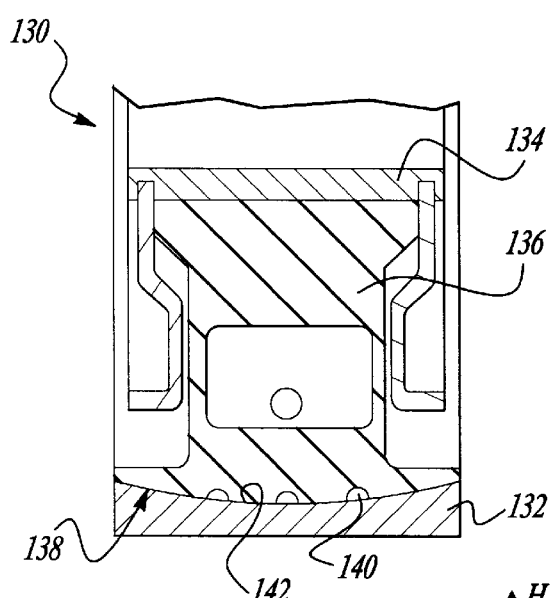
FIG. 11 is a sectional side view of a fifth embodiment of a hydraulic bearing, wherein the supporting body is pivotally arranged in the supporting member.

FIG. 11 shows a further embodiment of a hydraulically damped bearing 130 having a supporting member 132, a bearing bush 134 and a supporting body 136. The supporting body 136, fixedly connected to the bearing bush 134, has a slightly convex exterior surface 138, wherein three radially circumferential oil grooves 140 are formed in the exterior surface 138. The cylindrically shaped supporting member 132 has an interior circumferential surface 142 extending approximately along the exterior surface 138 of the supporting body 136. Due to this arrangement, it is possible to pivotally arrange the supporting body 136 within the supporting member 132 similar to a cardanic suspension, for compensating positional tolerances during the mounting of the bearing 130.

Figure 12:
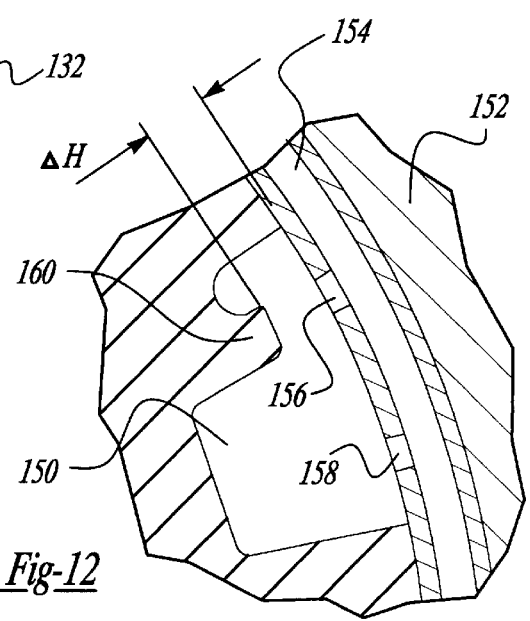
FIG. 12 is a sectional front view of a cavity of a sixth embodiment of a hydraulically damped bearing illustrated on a larger scale.

FIG. 12 shows a special embodiment of a cavity 150 in a supporting body 152. The cavity 150 is connected to other cavities via an annular tube portion 154, wherein two throttle openings 156 and 158 enable the damping fluid to flow into and out of the cavity 150. Further, approximately at the same height as the throttle opening 156, a control nap 160 is formed in the cavity 150. If the cavity 150 is compressed by an amount H, the control nap 160 closes the first throttle opening 156 so that the damping fluid can now only leave the cavity 150 through the second throttle opening 158. In this manner, the bearing may exhibit progressive damping properties if a predetermined stroke H is exceeded.

What is claimed is:

1. A hydraulically damped bearing for reducing vibration of a unit suspended in a frame, especially for reducing vibration of a mounted motor and a gear unit in a motor vehicle frame, comprising:
- a bearing member connected with a member selected from the group consisting of said unit and said frame;
- a supporting member connected with a member selected from the group consisting of said unit and said frame;
- an elastic supporting body arranged between said bearing member and said supporting member, said elastic supporting body being compressible along a first vibration axis and at least along a second vibration axis, said second vibration axis approximately corresponding to a resultant force resulting from the weight of said unit and the force resulting from the torque of the unit;
- a first compressible cavity filled with a damping fluid, said first compressible cavity contained within said elastic supporting body, said first compressible cavity arranged at least approximately in the region of said first vibration axis; and
- at least a second compressible cavity filled with said damping fluid, said second compressible cavity being connected to said first compressible cavity by means of a connecting member, said second compressible cavity arranged at least approximately in the region of said second vibration axis with said second vibration axis being oriented in a different direction than said first vibration axis.

2. A hydraulically damped bearing according to claim 1 wherein said elastic supporting body is cylindrically shaped.

3. A hydraulically damped bearing according to claim 1 wherein said elastic supporting body is arranged concentrically to said bearing member and is rigidly connected therewith.

4. A hydraulically damped bearing according to claim 1 wherein said supporting member is shell-shaped and at least partially surrounds said elastic supporting body.

5. A hydraulically damped bearing according to claim 1 wherein said supporting member is shaped as a cylinder jacket.

6. A hydraulically damped bearing according to claim 1 wherein support plates are arranged on said bearing member, said support plates being in contact with lateral surfaces on both sides of said elastic supporting body, said support plates permitting compression of said elastic supporting body at least along said second vibration axis.

7. A hydraulically damped bearing according to claim 6, wherein said support plates are shaped in such a way that said elastic supporting body is compressible along at least said second vibration axis only by a predetermined oscillation amplitude.

8. A hydraulically damped bearing according to claim 1 wherein said first compressible cavity is larger than said second compressible cavity, so that said second compressible cavity further serves as a reservoir for said damping fluid.

9. A hydraulically damped bearing according to claim 1 wherein said first compressible cavity and at least said second compressible cavity are interconnected by means of a tube having the shape as a ring portion and having at least one opening of a predetermined diameter in the region of each of said compressible cavity.

10. A hydraulically damped bearing according to claim 9 wherein at least one of said compressible cavities contains at least one control nap which, when the supporting body is compressed, closes the respective opening of said tube if a predetermined stroke is exceeded.

11. A hydraulically damped bearing according to claim 1 wherein said elastic supporting body is pivotally mounted in said supporting member.

12. A hydraulically damped bearing according to claim 1 wherein said unit is in the form of a motor having a flange-mounted gear unit and is suspended in the front region of said motor vehicle frame, said bearing member being in the form of a bearing bush and being connected to a front portion of said motor and said supporting member being rigidly mounted to said motor vehicle frame.

13. A hydraulically damped bearing according to claim 12 comprising at least two said compressible cavities; wherein said first vibration axis, located in the region where said first compressible cavity is arranged, extends approximately vertically; wherein all remaining vibration axes, located in the regions of the other of said compressible cavities, approximately correspond to a resultant force resulting from the weight of the motor and the gear unit, and the force resulting from the driving torque of the motor and the gear unit under predetermined driving conditions.

14. A hydraulically damped bearing according to claim 1 wherein each said compressible cavity has a shape that becomes larger in a preferred direction than in other directions, during compression of the compressible cavity; said preferred direction corresponding to the respective vibration axis of said elastic supporting body.

15. A hydraulically damped bearing according to claim 1 wherein each of said compressible cavity has a shape which permits a change in volume, depending on the oscillation amplitude to be damped, selected from the group consisting of linear, progressive, and degressive.

16. A hydraulically damped bearing according to claim 15 wherein said compressible cavities contain elastic side walls which, for a degressive change in volume as a function of oscillation amplitude, are convex in a non-compressed state.

17. A hydraulically damped bearing according to claim 15 wherein said compressible cavities contain elastic side walls which, for a progressive change in volume as a function of oscillation amplitude, are concave in a non-compressed state.

18. A hydraulically damped bearing according to claim 1 further comprising a gear unit attached to said motor.

19. A hydraulically damped bearing according to claim 1 further comprising a gear unit contained in said motor.

20. A hydraulically damped bearing according to claim 2 which comprises flattened sides on said elastic supporting body.

21. A hydraulically damped bearing according to claim 4 wherein said supporting member is flattened at the sides.

22. A hydraulically damped bearing comprising:
- a bearing member;
- a supporting member;
- a supporting body arranged between said bearing member and said supporting member, said supporting body being compressible along a plurality of vibration axes;
- a plurality of compressible cavities filled with a damping fluid, said compressible cavities being contained within said supporting body, one of said compressible cavities being arranged at least approximately in the region of each one of said vibration axes, said vibration axis being oriented in a non-orthogonal direction than other of said vibration axis; and
- a connecting member connecting each one of said compressible cavities to at least one other of said compressible cavities.

23. A hydraulically damped bearing according to claim 22 wherein said supporting body is made from an elastic material.

24. A hydraulically damped bearing according to claim 22 comprising a motor attached to a member selected from the group consisting of a bearing member and a supporting member.

25. A hydraulically damped bearing for reducing vibration of a motor having a flange-mounted gear unit and suspended in the front region of a motor vehicle frame comprising:

a bearing bush connected to a front portion of said motor;

a supporting member being rigidly mounted to said motor vehicle frame;

an elastic supporting body arranged between said bearing bush and said supporting member, said elastic supporting body being compressible along a first vibration axis extending approximately vertically and at least along a second vibration axis approximately corresponding to a resultant force resulting from the weight of the motor and the gear unit, and the force resulting from the driving torque of the motor and the gear unit under predetermined driving conditions;

a first compressible cavity filled with a damping fluid, said first compressible cavity contained within said elastic supporting body, said first compressible cavity arranged at least approximately in the region of said first vibration axis; and at least a second compressible cavity filled with said damping fluid, said second compressible cavity being connected to said first compressible cavity by means of a connecting member, said second compressible cavity arranged at least approximately in the region of said second vibration axis with said second vibration axis being oriented in a different direction than said first vibration axis.

* * * * *